(12) United States Patent
Proebstle et al.

(10) Patent No.: US 9,266,482 B2
(45) Date of Patent: Feb. 23, 2016

(54) ONBOARD POWER SUPPLY SYSTEM AND METHOD FOR OPERATING THE ONBOARD POWER SUPPLY SYSTEM

(75) Inventors: Hartmut Proebstle, Augsburg (DE);
Rupert Neudecker, Munich (DE);
Ottmar Sirch, Ebersberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 920 days.

(21) Appl. No.: 13/473,295

(22) Filed: May 16, 2012

(65) Prior Publication Data

US 2012/0299374 A1    Nov. 29, 2012

Related U.S. Application Data

(63) Continuation of application No. PCT/EP2010/004699, filed on Jul. 31, 2010.

(30) Foreign Application Priority Data

Nov. 19, 2009   (DE) .......................... 10 2009 053 691

(51) Int. Cl.
*B60L 1/00*     (2006.01)
*B60R 16/03*    (2006.01)

(52) U.S. Cl.
CPC ...................................... *B60R 16/03* (2013.01)

(58) Field of Classification Search
CPC ....................................................... B60R 16/03
See application file for complete search history.

(56) References Cited

U.S. PATENT DOCUMENTS

| 3,809,995 | A | 5/1974 | Hardin |
| 4,491,779 | A | 1/1985 | Campbell et al. |
| 7,180,205 | B2 | 2/2007 | Wirdel |
| 2003/0057776 | A1 | 3/2003 | Takase et al. |

(Continued)

FOREIGN PATENT DOCUMENTS

| DE | 37 17 716 A1 | 10/1987 |
| DE | 197 55 050 A1 | 7/1999 |

(Continued)

OTHER PUBLICATIONS

German Search Report dated Apr. 14, 2010 w/English translation (nine 9 pages).

(Continued)

*Primary Examiner* — Jared Fureman
*Assistant Examiner* — Aqeel Bukhari
(74) *Attorney, Agent, or Firm* — Crowell & Moring LLP

(57) ABSTRACT

An onboard power supply system for a motor vehicle includes a voltage converter and a voltage source which is electrically coupled with the voltage converter and is constructed for providing a predefined source voltage. The onboard power supply system further has a base energy accumulator which is electrically coupled with the voltage converter and is constructed for providing a predefined base voltage. With respect to the amount, the source voltage is greater than the base voltage. The onboard power supply system also has at least one first selection circuit of at least one first electric consuming device which can be electrically coupled parallel to the voltage converter. Furthermore, the onboard power supply system has at least one second selection circuit of at least one second electric consuming device which can be electrically coupled parallel to the base energy accumulator.

14 Claims, 1 Drawing Sheet

(56) References Cited

U.S. PATENT DOCUMENTS

| | | |
|---|---|---|
| 2003/0072977 A1 | 4/2003 | Speranza et al. |
| 2003/0184314 A1 | 10/2003 | Barak |
| 2004/0130214 A1* | 7/2004 | Murty et al. .................... 307/66 |
| 2005/0105237 A1* | 5/2005 | D'Amato ...................... 361/118 |
| 2007/0090808 A1 | 4/2007 | McCabe et al. |

FOREIGN PATENT DOCUMENTS

| | | |
|---|---|---|
| DE | 103 04 764 B3 | 2/2004 |
| DE | 102 47 523 A1 | 4/2004 |
| DE | 10 2004 043 129 A1 | 3/2006 |
| DE | 10 2005 004 330 A1 | 8/2006 |
| DE | 10 2007 014 383 A1 | 10/2008 |
| DE | 10 2008 039 284 A1 | 2/2010 |
| DE | 10 2009 028 147 A1 | 2/2011 |
| EP | 1 295 757 A2 | 3/2003 |
| EP | 1 591 320 A1 | 11/2005 |
| EP | 2 079 148 A2 | 7/2009 |

OTHER PUBLICATIONS

International Preliminary Report on Patentability (PCT/IB/338 & PCT/IB/373) dated Jun. 21, 2012 (two (2) pages).
Written Opinion (PCT/ISA/237) dated Dec. 2, 2010 (six (6) pages).
German Search Report dated Mar. 19, 2012 with partial English translation (ten (10) pages).
International Search Report dated Dec. 2, 2010 with English translation (six (6) pages).

* cited by examiner

ONBOARD POWER SUPPLY SYSTEM AND METHOD FOR OPERATING THE ONBOARD POWER SUPPLY SYSTEM

CROSS-REFERENCE TO RELATED APPLICATIONS

This application is a continuation of PCT International Application No. PCT/EP2010/004699, filed Jul. 31, 2010, which claims priority under 35 U.S.C. §119 from German Patent Application No. DE 10 2009 053 691.4, filed Nov. 19, 2009, the entire disclosures of which are herein expressly incorporated by reference.

BACKGROUND AND SUMMARY OF THE INVENTION

The invention relates to an onboard power supply system for a motor vehicle and to a method and a device for operating the onboard power supply system.

In modern motor vehicles, high demands are made on an electric onboard power supply system with an electric energy accumulator (storage device), particularly in the case of motor vehicles capable of converting kinetic energy of the motor vehicle, for example, within the scope of a braking operation, to electric energy and returning it to the energy accumulator.

It is an object of the invention to create an onboard power supply system of a motor vehicle and a method and a corresponding device for operating the onboard power supply system which permits an efficient operation of consuming devices.

This and other objects are achieved in accordance with the invention. According to a first aspect of the invention, an onboard power supply system for a motor vehicle includes a voltage converter having a first connection and a second connection. The onboard power supply system also includes a voltage source which is electrically coupled with the first connection of the voltage converter and is constructed for providing a predefined source voltage. Furthermore, the onboard power supply system includes a base energy accumulator which, by way of its first connection, is electrically coupled with the second connection of the voltage converter and, by way of its second connection, is electrically coupled with the reference potential and is constructed for providing a predefined base voltage. With respect to the amount, the source voltage of the voltage source is greater than the base voltage. Furthermore, the onboard power supply system has at least one first selection circuit of at least one first electrical consuming device which is arranged so that it can be electrically coupled parallel to the voltage converter. The onboard power supply system also has at least one second selection circuit of at least one second electrical consuming device which is arranged so that it can be electrically coupled parallel to the base energy accumulator.

Such an onboard power supply system permits a particularly power-loss-reduced operation. In particular, power loss allocated to the voltage converter is reduced in that at least a portion of a current for operating the coupled and switched-on consuming devices is not guided by way of the voltage converter, but is preferably fed directly from the voltage source and/or the base energy accumulator to the corresponding consuming devices. If the source voltage is approximately twice as large as the base voltage, the at least one first selection and the at least one second selection is, in each case, acted upon by approximately the same voltage. The voltage assigned to the at least one first selection is a result of a difference between the source voltage and the base voltage. The source voltage and the base voltage are in each case preferably a direct voltage.

The voltage converter may, for example, be constructed as a voltage regulator, thus, for example, as a switching regulator. It may also be constructed, for example, as a unidirectional transformer and therefore provide the base voltage and/or a base current as a function of the source voltage at the first connection on the output side at its second connection. This contributes to the fact that undervoltages at the second connection are compensated. However, the voltage converter may, for example, also be constructed as a bidirectional transformer and, in addition to the unidirectional transformer, also as a function of the base voltage at the second connection, provide the source voltage and/or a source current at the first connection. In this case, overvoltages at the second connection may preferably also be compensated by way of the bidirectional voltage converter. This permits a balancing to the extent that, for example, the first selection and the second selection are in each case acted upon by approximately identical voltages.

The at least one first consuming device of the first selection and the at least one second consuming device of the second selection are constructed so that they can be switched on and off and are thereby acted upon by the respective voltage as a function of their switching condition. High-current consuming devices, for example, such as a starting system, can be assigned to the first selection. A power consumption of the first selection is preferably lower than a power consumption of the second selection. Particularly when a unidirectional voltage converter is used, this can contribute to the fact that energy required for operating the second selection is transmitted from the first connection to the second connection of the voltage converter. If the power consumption of the first selection is lower, the latter, as required, can be operated only to a limited extent or not at all, particularly when a unidirectional voltage converter is used which transmits electric energy from its first connection to its second connection. This can be made possible particularly by the use of a bidirectional voltage converter.

The energy accumulator may be constructed, for example, as a lead accumulator, in which case other constructions can also be used.

In a further advantageous development of the first aspect, the voltage source includes an additional energy accumulator and/or a generator for providing the source voltage. The generator may, for example, be a generator of the motor vehicle. The additional energy accumulator is, for example, constructed as a li-ion accumulator and, in motor vehicles, particularly hybrid vehicles, which have an energy recovery device, thus, for example, during a braking operation, can be called a recuperation accumulator. The generator is operated at least temporarily during an operation of the motor vehicle in order to approximately provide the source voltage, the source voltage also including a voltage provided by the generator for permitting a reliable charging of the additional energy accumulator and/or of the base energy accumulator. The generator can also be operated during a recuperation phase, i.e., during an energy feedback, for example, during the braking operation or during a coasting operation of the motor vehicle in order to, for example, convert kinetic energy of the motor vehicle to electric energy. The generator can, for example, also be constructed as a starter generator and thereby can also be used for starting an internal-combustion engine of the motor vehicle. When both components are present, the generator is preferably electrically coupled parallel to the additional energy accumulator.

According to a second aspect, the invention is characterized by an onboard power supply system for a motor vehicle that has an energy accumulator and a base energy accumulator. The two energy accumulators are electrically connected in series. The energy accumulator is constructed for providing a predefined voltage. The base energy accumulator is constructed for providing a predefined base voltage. The onboard power supply system also has a voltage source which can be electrically coupled with the energy accumulator and is constructed for providing a source voltage. The source voltage is approximately as large as a sum of the voltage and the base voltage. Furthermore, the onboard power supply system has at least one first selection of at least one first electric consuming device which is arranged so that it can be electrically coupled parallel to the energy accumulator. Furthermore, the onboard power supply system has at least one second selection of at least one second electric consuming device which is arranged so that it can be electrically coupled parallel to the base energy accumulator.

This makes it possible to obtain a particularly simple and cost-effective onboard power supply system with a power-loss-reduced operation. In particular, a portion of a current for operating the coupled and switched-on consuming devices is not conducted by way of the base energy accumulator but preferably directly from the voltage source and/or the energy accumulator. The voltage source preferably includes only the generator for providing the source voltage.

In an advantageous further development of the first and the second aspect, one of the first selections is assigned to one of the second selections, specifically such that the respective first selection has approximately the same power consumption as the assigned second selection. The first selection has a predefined number of first electric consuming devices, and the second selection has a predefined number of second electric consuming devices, in which case also only one corresponding electric consuming device may be assigned to the first selection or to the second selection. The first and assigned second selection thereby represents an approximately symmetrical load. This has the advantage that source current essentially flows through the first and assigned second selection, whereby the voltage converter and/or the base energy accumulator can be relieved.

Generally, more than one first selection and more than one second selection may also be present.

In a further advantageous development of the first and second aspect, the respective first selection and the assigned second selection are predefined such that both have approximately the same time-related progression of the power consumption. This can take place, for example, in that the at least one first consuming device of the first selection and the at least one second consuming device of the assigned second selection can be switched on and off approximately isochronously. This makes it possible to obtain a symmetrical load and a power-loss-reduced operation of the onboard power supply system. Consuming devices of the respective selection can also be predefined which also have different power consumptions at different points in time during their operation.

In a further advantageous development of the first and second aspect, the onboard power supply system has at least one additional consuming device which can be electrically coupled parallel to the voltage source. Also, this arrangement of the at least one further electric consuming device can contribute to the fact that a current provided by the voltage converter and/or base energy accumulator can be reduced. In particular, this results in a reduced current demand from the voltage source because the at least one additional consuming device is operated at the source voltage whose amount is larger than that of the base voltage. Preferably, voltage-insensitive loads, such as the seat heaters, and the rear window heater, the steering system, can be used as additional consuming devices.

At least one safety-critical electric consuming device respectively is preferably assigned to the first selection and/or the second selection.

According to a third and fourth aspect, the invention is characterized by a method and a corresponding device for operating an onboard power supply system according to the first aspect, by which faults in line sections assigned to the voltage converter, and/or of the voltage converter itself, are detected. As a function of the detection, the consuming device or the first consuming devices of at least one of the at least one first selection are switched on. This has the advantage that the base energy accumulator can continue to be charged by way of the at least one switched-on first selection. In addition, it is possible to operate at least one second electric consuming device or at least one second selection. This permits a particularly reliable operation of the motor vehicle. The line sections assigned to the voltage converter include, for example, feed lines to the voltage converter and lines arranged between the voltage converter and the respective electric consuming device supplied by it.

Other objects, advantages and novel features of the present invention will become apparent from the following detailed description of one or more preferred embodiments when considered in conjunction with the accompanying drawings.

DETAILED DESCRIPTION OF THE DRAWINGS

Elements of the same construction or function have the same reference numbers in both figures.

Figure 1:
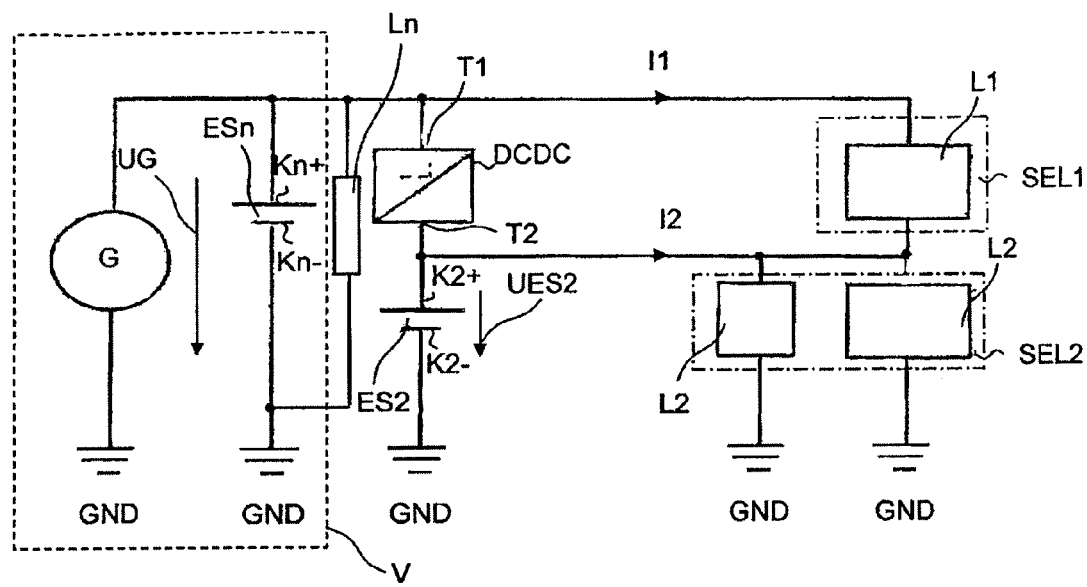
FIG. 1 is a first schematic representation of an onboard power supply system.

FIG. 1 illustrates a schematic representation of an onboard power supply system for a motor vehicle. The onboard power supply system has a voltage source V including a further energy accumulator ESn which is constructed, for example, as a li-ion accumulator. The motor vehicle, thus, for example, a hybrid or electric vehicle, may, for example, include an energy recovery device in order to recover kinetic energy of the motor vehicle as electric energy, thus, for example, during a braking operation of the motor vehicle. In this case, the additional energy accumulator ESn may also be called a recuperation accumulator and can be charged during a recuperation phase. The additional energy accumulator ESn is constructed for providing a source voltage UG, thus, for example, 24 V.

The onboard power supply system further includes a base energy accumulator ES2 which is, for example, constructed as a lead accumulator and provides a base voltage UES2, thus, for example, 12 V. A value of the source voltage UG preferably is greater than a value of the base voltage UES2.

Furthermore, the onboard power supply system has a voltage converter DCDC having a first connection T1 and a second connection T2. The voltage converter DCDC is, for example, constructed as a unidirectional voltage converter, thus, for example, as a linear control device. The additional energy accumulator ESn has a first connection, thus, for example, a positive terminal, and a second connection, thus, for example, a negative terminal. The first connection may also be called a first terminal Kn+ and the second connection may also be called a second terminal Kn− of the additional energy accumulator ESn. The additional energy accumulator ESn is electrically coupled by way of its first terminal Kn+ with the first connection T1 of the voltage converter DCDC and by way of its second terminal Kn− with a reference potential GND, for example, a chassis ground of the motor vehicle.

The base energy accumulator ES2 also has a first connection, thus, for example, a positive terminal, and a second connection, thus, for example, a negative terminal, in which case the first connection can be called a first terminal K2+ and the second connection can be called a second terminal K2−. The base energy accumulator ES2 is preferably electrically coupled, by way of its first terminal K2+, with the second connection T2 of the voltage converter DCDC and, by way of its second terminal K2−, with the reference potential GND.

Furthermore, the voltage source V has a generator G, which is preferably electrically arranged in parallel with the additional energy accumulator ESn and is used, for example, as the generator of the motor vehicle. The generator G is preferably operated at least temporarily during an operation of the motor vehicle and is constructed to provide approximately the source voltage UG during its operation. As a function of this source voltage UG, the additional energy accumulator ESn and/or the base energy accumulator ES2 can be charged by way of the voltage converter DCDC and/or consuming devices can be operated in the onboard power supply system.

The onboard power supply system includes at least one first electric consuming device L1 and at least one second electric consuming device L2, which can each be switched on and off at least partially.

The first electric consuming device L1 can be electrically coupled parallel to the voltage converter DCDC and can be acted upon by a voltage resulting from a difference between the source voltage UG and the base voltage UES2, thus, for example, 12 V. The second electric consuming device L2 is arranged so that it can be electrically coupled between the second connection T2 and the reference potential GND and can be acted upon by the base voltage UES2. Several first electric consuming devices L1 and several second electric consuming devices L2 may also be provided, in which case a number of first electric consuming devices L1 does not necessarily have to correspond to a number of second electric consuming devices L2.

A first selection circuit SEL1 of the first electric consuming devices L1 comprises a predefined number of first electric consuming devices L1, and a second selection circuit SEL2 of the second electric consuming devices L2 comprises a predefined number of second electric consuming devices L2, specifically preferably such that a resulting power consumption of the first selection is approximately equal to a resulting power consumption of the second selection SEL2. Furthermore, the respective first selection SEL1 and the assigned second selection SEL2 may be predefined such that both have approximately an identical time-related progression of the power consumption. Thus, for example, the at least one first electric consuming device L1 of the first selection SEL1 may be capable of being approximately isochronously switched on and off with respect to the at least one second electric consuming device L2 of the assigned second selection SEL2. The respective first selection SEL1 can thereby be assigned to the second selection SEL2 such that both represent an approximately symmetrical load. Also only one respective corresponding electric consuming device may be assigned to the first selection SEL1 or the second selection SEL2. Generally, more than one first selection SEL1 and more than one second selection SEL2 may also be present. The first electric consuming device L1 may, for example, be constructed as a left headlight, a left taillight and/or a left brake light; and the second electric consuming device L2 may, for example, be constructed as a right headlight, right taillight and/or right brake light. Also safety-critical systems of the motor vehicle, which preferably require a redundant energy supply, can be operated by way of the onboard power supply system. Thus, for example, in the case of an electromechanical braking system, a brake circuit assigned to the rear axle of the motor vehicle can be assigned to the first selection, and a brake circuit assigned to the front axle of the motor vehicle can be assigned to the second selection.

A source current I1 flows through the at least one first electric consuming device L1 of the first selection SEL1 and through the at least one second electric consuming device L2 of the second selection SEL2. Ideally, the power consumption of the first selection SEL1 and the power consumption of the assigned second selection SEL2 are identical, so that an identical amount of source current I1 flows through both. In this case, preferably no current is provided by the voltage converter DCDC and/or the base energy accumulator ES2 for operating the first and assigned second selection SEL1, SEL2. However, in practice, for example, component tolerances may result in different power consumptions of the corresponding consuming devices, so that, if required, compensating currents can also be provided by the voltage converter DCDC and/or the base energy accumulator ES2 in order to, for example, be able to operate the second selection SEL2 by way of a predefined power. In this case, at least the resulting base current I1 is not provided by way of the voltage converter DCDC and thereby relieves the latter.

However, it is generally also possible to not assign at least one first electric consuming device L1 and/or at least one second electric consuming device L2 to a respective selection SEL1, SEL2 and therefore to not operate them symmetrically. In this case, if required, higher compensating flows can be provided or removed by the voltage converter DCDC and/or base energy accumulator ES2.

The voltage converter DCDC can, for example, also be constructed as a bidirectional transformer, thus, for example, as a switching regulator. As a result, it is capable of, also as a function of the base voltage UES2 at its second connection T2, approximately providing the source voltage UG at its first connection T1, to the at least one first electric consuming device L1. In this case, at least one resulting base current I2, for example, for supplying non-symmetrical loads, which is provided, for example, by the base energy accumulator ES2, is not provided by the voltage converter DCDC, whereby, also here, a power-loss-reduced operation of the onboard power supply system is made possible.

A use of the voltage converter DCDC generally has the advantage of making it possible to achieve a higher voltage stability compared to the generator G. For example, the voltage converter DCDC can balance the provided base voltage UES2 and the differential voltage, which results from the difference between the source voltage UG and the base voltage UES2, and thereby avoid unequal supply conditions, thus, for example, different brightness at the right and left headlight. Furthermore, as a result of the voltage converter DCDC, an energy transfer from the additional energy accumulator ESn to the base energy accumulator ES2, can take place such that the latter is charged to such an extent that electric consuming devices can continue to operate also after extended parked periods of the motor vehicle, or a starting capability of the motor vehicle can be ensured.

At least a portion of the current required for operating the electric consuming devices is generally not provided by way of the voltage converter DCDC, so that, as a result, the power loss, particularly the current-dependent power loss, of the voltage converter DCDC is reduced in order to allow an efficient operation of the onboard power supply system. In addition, a consumption, particularly a fuel consumption, of the motor vehicle can also be reduced. As required, the voltage converter DCDC may also have smaller dimensions in comparison to an operation in which it supplies the current for all electric consuming devices. This also makes it possible to obtain a cost-effective onboard power supply system.

If it is recognized, for example, by use of an energy management unit of the motor vehicle that one or more line sections assigned to the voltage converter DCDC and/or the voltage converter DCDC itself is or are faulty, for example, at least one assigned first selection SEL1 can be switched on, in order to continue to be able to operate at least one switched-on second electric consuming device L2 of the second selection SEL2. As an alternative or in addition, in the event of a fault, the base energy accumulator ES2 can also continue to be charged by way of the at least one first selection SEL1. This is advantageous if safety-critical electric consuming devices are assigned to the first and/or second selection, which electric consuming devices require a redundant energy supply, thus, for example, an electromechanical braking system, because, as a result, in the event of a fault, a continued operation of these consuming devices is made possible.

It is generally also contemplated to dynamically predefine the first selection SEL1 and/or the second selection SEL2 during the operation of the onboard power supply system, thus, for example, with respect to the number of the consuming devices per selection and/or a sum of the resulting power consumption of the consuming devices per selection. However, the respective first selection SEL1 and/or the assigned second selection SEL2 may also be predefined.

Furthermore, the onboard power supply system may also have at least one additional electric consuming device Ln which can be electrically coupled parallel to the voltage source v. In the switched-on condition, the at least one additional electric consuming device Ln is preferably acted upon by the source voltage UG and is preferably voltage-insensitive systems, for example, the seat heaters, the rear window heater, or power-intensive systems, for example, the steering system. This also contributes to a reduction of the power loss of the onboard power supply system because, also in this case, the required current for the at least one additional consuming device Ln is preferably not provided by way of the voltage converter DCDC and/or the base energy accumulator ES2.

Figure 2:
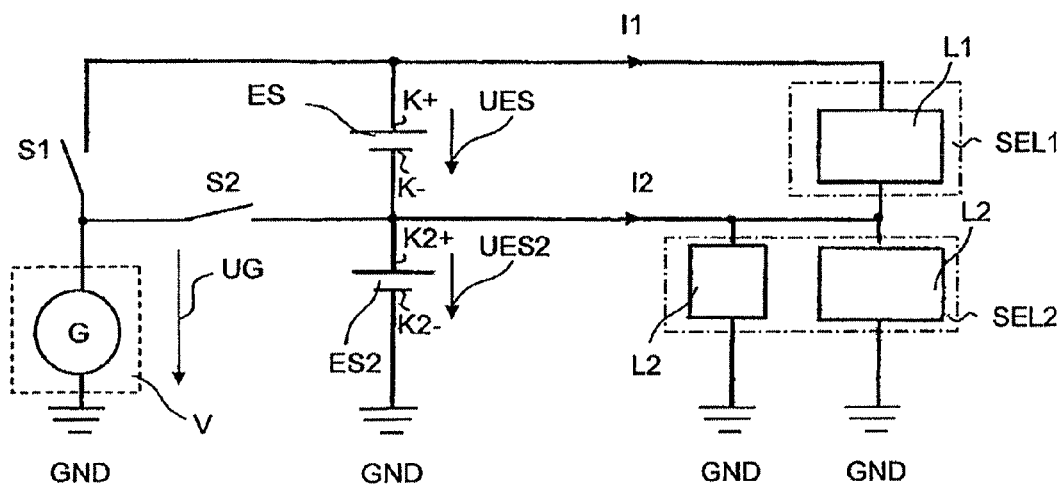
FIG. 2 is a second schematic representation of an onboard power supply system.

FIG. 2 schematically illustrates a further embodiment of the onboard power supply system. The onboard power supply system includes the voltage source V, which preferably includes only the generator G. Compared to FIG. 1, the base energy accumulator ES2 is electrically coupled in series with an energy accumulator ES and, by way of the latter, is electrically coupled with the voltage source V. The energy accumulator ES is constructed for providing a predefined voltage UES. The predefined voltage UES is preferably approximately equal to the base voltage UES2. The first selection and the second selection respectively correspond to the first and the second selection respectively of the onboard power supply system according to FIG. 1. The onboard power supply system illustrated in FIG. 2 permits a relieving of the base energy accumulator if the first and the assigned second selection are correspondingly predefined.

For example, high-power consuming devices, as, for example, consuming devices having a power consumption of more than 500 w, such as a steering system or a starting system, may be assigned as a first electric consuming device to the first selection.

The generator G can be operated very flexibly by use of a first and second switching element S1, S2. The generator G is preferably constructed for providing, as a function of a control unit assigned to it, either the source voltage UG or approximately the base voltage UES2. Thus, for example, by correspondingly controlling the first switching element S1 during a recuperation phase, the generator G can be operated such that the latter charges the energy accumulator ES and the base energy accumulator ES2, and/or operates the at least one first selection SEL1 and/or the at least one second selection SEL2. When the second switching element S2 is controlled correspondingly, for example, only the base energy accumulator ES2 and/or the at least one second selection SEL2 can be operated.

The first and second switching element S1, S2 can be controlled, for example, by the energy management unit.

LIST OF REFERENCE SYMBOLS

ES Energy accumulator
ESn Additional energy accumulator
ES2 Base energy accumulator
DCDC Voltage converter
G Generator
GND Reference potential
I1 Source current
I2 Base current
K+, K2+
Kn+ First terminal
K−, K2−,
Kn− Second terminal
L1 First electric consuming device
L2 Second electric consuming device
Ln Additional electric consuming device
S1, S2 Switching element
SEL1 First selection
SEL2 Second selection
T1 First connection of the voltage converter
T2 Second connection of the voltage converter
V Voltage source
UES Voltage
UES2 Base voltage
UG Source voltage The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An onboard power supply system for a motor vehicle, comprising:
   a voltage converter having a first connection and a second connection,
   a voltage source electrically coupled with the first connection of the voltage converter, the voltage source being operatively configured to provide a predefined source voltage,
   a base energy accumulator having a first connection electrically coupled with the second connection of the voltage converter, and a second connection electrically coupled with a reference potential, the base energy accumulator being operatively configured to provide a predefined base voltage, wherein an amount of the predefined source voltage of the voltage source is greater than the base voltage, at least one first selection circuit of at least one first electric consuming device, the at least one first electric consuming device being arranged electrically coupleable parallel to the voltage converter, wherein the at least one first electric consuming device is acted upon by a voltage resulting from a difference between the predefined source voltage of the voltage source and the base voltage, at least one second selection circuit of at least one second electric consuming device, the at least one second electric consuming device being arranged electrically coupleable parallel to the base energy accumulator.

2. The onboard power supply system according to claim 1, wherein the voltage converter is a bidirectional transformer.

3. The onboard power supply system according to claim 1, wherein the voltage source comprises at least one of an additional energy accumulator and a generator for providing the predefined source voltage.

4. The onboard power supply system according to claim 1, wherein one of the at least one first selection circuit is assigned to one of the at least one second selection circuit, the respective first selection circuit approximately having an equal power consumption as the assigned second selection circuit.

5. The onboard power supply system according to claim 4, wherein the respective first selection circuit and the assigned second selection circuit are predefined to both have approximately a same time-related progression of power consumption.

6. The onboard power supply system according to claim 1, further comprising:
at least one additional consuming device electrically coupleable in parallel to the voltage source.

7. An onboard power supply system for a motor vehicle, comprising:
an energy accumulator and a base energy accumulator electrically connected in series, the energy accumulator being operatively configured to provide a predefined voltage and the base energy accumulator being operatively configured to provide a predefined base voltage;
a voltage source electrically coupleable with the energy accumulator, the voltage source being operatively configured to provide a source voltage that is approximately equal to a sum resulting from the predefined voltage and the predefined base voltage;
at least one first selection circuit of at least one first electric consuming device, the at least one first electric consuming device being switchably coupleable in parallel to the energy accumulator by a first switching element; and
at least one second selection circuit of at least one second electric consuming device, the at least second electric consuming device being arranged electrically coupleable parallel to the base energy accumulator.

8. The onboard power supply system according to claim 7, wherein one of the at least one first selection circuit is assigned to one of the at least one second selection circuit, the respective first selection circuit approximately having an equal power consumption as the assigned second selection circuit.

9. The onboard power supply system according to claim 8, wherein the respective first selection circuit and the assigned second selection circuit are predefined to both have approximately a same time-related progression of power consumption.

10. The onboard power supply system according to claim 7, further comprising:
at least one additional consuming device electrically coupleable in parallel to the voltage source.

11. A method of operating an onboard power supply system for a motor vehicle comprising:
a voltage converter having a first connection and a second connection,
a voltage source electrically coupled with the first connection of the voltage converter, the voltage source being operatively configured to provide a predefined source voltage,
a base energy accumulator having a first connection electrically coupled with the second connection of the voltage converter, and a second connection electrically coupled with a reference potential, the base energy accumulator being operatively configured to provide a predefined base voltage, wherein an amount of the predefined source voltage of the voltage source is greater than the base voltage,
at least one first selection circuit of at least one first electric consuming device, the at least one first electric consuming device being arranged electrically coupleable parallel to the voltage converter, wherein the at least one first electric consuming device is acted upon by a voltage resulting from a difference between the predefined source voltage of the voltage source and the base voltage,
at least one second selection circuit of at least one second electric consuming device, the at least one second electric consuming device being arranged electrically coupleable parallel to the base energy accumulator, the method comprising the acts of:
detecting faults in at least one of line sections assigned to the voltage converter and the voltage converter; and
switching-on the first consuming device or devices of at least one of the at least one first selection circuit as a function of the detecting.

12. A method of operating an onboard power supply system for a motor vehicle comprising:
an energy accumulator and a base energy accumulator electrically connected in series, the energy accumulator being operatively configured to provide a predefined voltage and the base energy accumulator being operatively configured to provide a predefined base voltage;
a voltage source electrically coupleable with the energy accumulator, the voltage source being operatively configured to provide a source voltage that is approximately equal to a sum resulting from the predefined voltage and the predefined base voltage;
at least one first selection circuit of at least one first electric consuming device, the at least one first electric consuming device being switchably coupleable in parallel to the energy accumulator by a first switching element; and
at least one second selection circuit of at least one second electric consuming device, the at least second electric consuming device being arranged electrically coupleable parallel to the base energy accumulator, the method comprising the acts of:
detecting faults in at least one of line sections assigned to the voltage converter and the voltage converter; and
switching-on the first consuming device or devices of at least one of the at least one first selection circuit as a function of the detecting.

13. The onboard power supply system of claim 7, wherein the at least one second selection circuit is switchably coupleable in parallel to the base energy accumulator by a second switching element.

14. The method of claim 12, wherein the at least one second selection circuit is switchably coupleable in parallel to the base energy accumulator by a second switching element.

\* \* \* \* \*